United States Patent
Hauser et al.

(10) Patent No.: US 10,272,882 B2
(45) Date of Patent: Apr. 30, 2019

(54) WINDSHIELD WIPING DEVICE FOR A VEHICLE

(71) Applicant: Robert Bosch GmbH, Stuttgart (DE)

(72) Inventors: Florian Hauser, Achern (DE); Michael Weiler, Buehl (DE); Peter Deak, Budapest (HU); Viktor Hackl, Sopron (HU)

(73) Assignee: Robert Bosch GmbH, Stuttgart (DE)

( * ) Notice: Subject to any disclaimer, the term of this patent is extended or adjusted under 35 U.S.C. 154(b) by 348 days.

(21) Appl. No.: 15/114,815

(22) PCT Filed: Dec. 23, 2014

(86) PCT No.: PCT/EP2014/079125
§ 371 (c)(1),
(2) Date: Jul. 27, 2016

(87) PCT Pub. No.: WO2015/113714
PCT Pub. Date: Aug. 6, 2015

(65) Prior Publication Data
US 2016/0347285 A1 Dec. 1, 2016

(30) Foreign Application Priority Data
Jan. 31, 2014 (DE) .................. 10 2014 201 737

(51) Int. Cl.
*B60S 1/38* (2006.01)
*B60S 1/32* (2006.01)

(52) U.S. Cl.
CPC .............. *B60S 1/3801* (2013.01); *B60S 1/32* (2013.01); *B60S 2001/3812* (2013.01);
(Continued)

(58) Field of Classification Search
CPC ...... B60S 2001/3837; B60S 2001/3836; B60S 2001/3812
See application file for complete search history.

(56) References Cited

U.S. PATENT DOCUMENTS 2,847,694 A * 8/1958 Chambers ................ B60S 1/38
  15/250.43
3,566,432 A * 3/1971 Quinlan .................... B60S 1/38
  15/250.41
(Continued)

FOREIGN PATENT DOCUMENTS

CN    2744569 Y    12/2005
DE    2509524 A1    9/1976
(Continued)

OTHER PUBLICATIONS

International Search Report for Application No. PCT/EP2014/079125 dated Mar. 19, 2015 (English Translation, 2 pages).

*Primary Examiner* — Andrew A Horton
(74) *Attorney, Agent, or Firm* — Michael Best & Friedrich LLP

(57) ABSTRACT

The invention relates to a windshield wiper device (50, 70) for a vehicle, in particular a motor vehicle. The windshield wiper device comprises a wiper blade (51, 71) with an elongated upper part (52, 72) which is designed to be at least partly flexible, an elongated lower part (53, 73) which is designed to be at least partly flexible, and multiple connection elements (18) for connecting the upper part (52, 72) and the lower part (53, 73). The connection elements (18) are mutually spaced along a longitudinal extension (8) of the wiper blade (51, 71), and the connection elements (18) are designed to allow the upper part (52, 72) and the lower part (53, 73) to move relative to each other with a movement component along a longitudinal extension (8) of the wiper blade (51, 71), a cross-section of the wiper blade (51, 71) perpendicular to the longitudinal extension (8) of the wiper blade being substantially trapezoidal.

21 Claims, 5 Drawing Sheets

(52) U.S. Cl.
CPC .............. *B60S 2001/3825* (2013.01); *B60S 2001/3832* (2013.01); *B60S 2001/3836* (2013.01); *B60S 2001/3837* (2013.01)

(56) References Cited

U.S. PATENT DOCUMENTS

| | | | |
|---|---|---|---|
| 3,631,561 A | 1/1972 | Aszkenas | |
| 7,007,340 B1 | 3/2006 | James | |
| 2003/0138655 A1 | 7/2003 | Watanabe et al. | |
| 2007/0017056 A1* | 1/2007 | Cooke | B60S 1/3808 15/250.201 |
| 2007/0186366 A1 | 8/2007 | Alley | |
| 2011/0247167 A1* | 10/2011 | Huang | B60S 1/3881 15/250.32 |
| 2012/0124767 A1* | 5/2012 | Thielen | B60S 1/3889 15/250.361 |

FOREIGN PATENT DOCUMENTS

| | | |
|---|---|---|
| DE | 8603219 | 3/1986 |
| DE | 8602334 | 4/1986 |
| DE | 29813251 U1 | 11/1998 |
| DE | 19754449 A1 | 5/1999 |
| FR | 2526382 | 11/1983 |
| FR | 2526383 A1 | 11/1983 |

\* cited by examiner

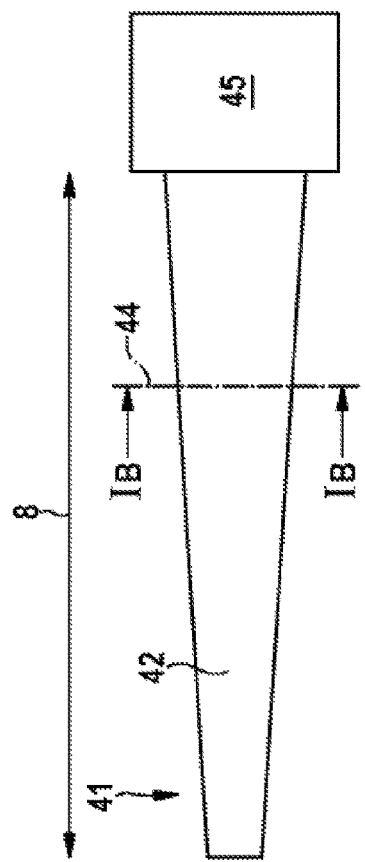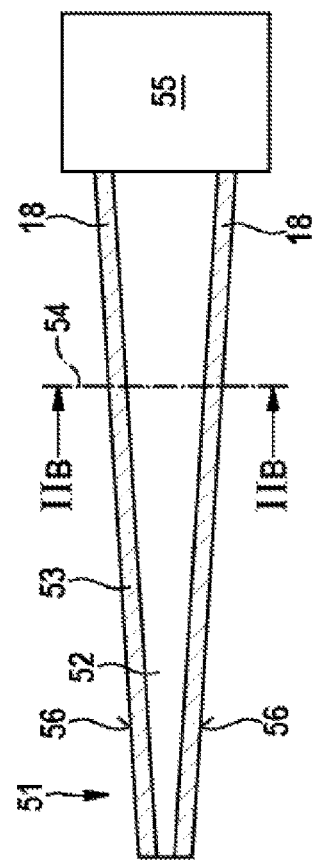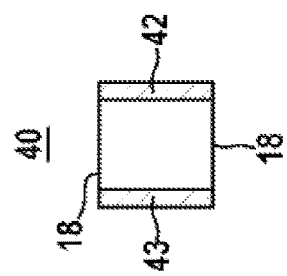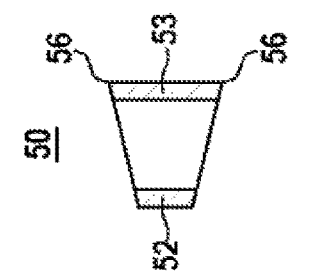

WINDSHIELD WIPING DEVICE FOR A VEHICLE

BACKGROUND OF THE INVENTION

The invention concerns a windshield wiping device for a vehicle, especially a motor vehicle.

Windshield wiping devices typically have a wiper arm or wiper lever, wherein a wiper blade, on which a wiper lip is attached, is moved on the window of a motor vehicle. The wiper arm is moved alternating between a first turning point and a second turning point. For this purpose, the wiper arm is connected via the drive shaft to a wiper motor.

In the windshield wiping devices known in the prior art, it can happen that the wiper blade loses contact with the window when driving fast, especially on windshields with large changes in curvature. This can result in the formation of streaks and/or fogging. High requirements are also placed on windshield wiping devices during extreme weather conditions, such as the handling and removal of water and/or snow from the windshield. Especially in the case of snow, windshield wiping devices known from the prior art have drawbacks. Thus, a snow wedge is formed by traditional wipers, resulting in steadily increasing forces acting on the wiper or needing to be exerted by it. The field of vision can also be reduced, since the snow cannot be removed adequately from the windshield.

There is thus a need to further improve windshield wiping devices, especially in terms of the avoidance of formation of streaks and/or fogging when driving fast and in terms of the ability to remove snow from the windshield.

SUMMARY OF THE INVENTION

The problem which the present invention proposes to solve is to provide a windshield wiping device with which at least one or more of the aforementioned drawbacks is lessened or essentially does not occur.

According to embodiments of the invention, a windshield wiping device is provided for a vehicle, especially a motor vehicle. The windshield wiping device comprises a wiper blade with an elongated upper part, which is at least partly bendable, an elongated lower part, which is at least partly bendable, several connection elements for connecting the upper part and the lower part, wherein the connection elements are spaced apart from each other along a lengthwise dimension of the wiper blade, and wherein the connection elements are designed to enable a movement of the upper part and the lower part relative to each other with a movement component along a lengthwise dimension of the wiper blade. In a cross section of the wiper blade perpendicular to its lengthwise dimension the upper part has a first dimension in a plane parallel to a wiping plane and the lower part has a second dimension in a plane parallel to the wiping plane, wherein the first dimension of the upper part is smaller than the second dimension of the lower part.

According to embodiments of the invention, a windshield wiping device is provided for a vehicle, especially a motor vehicle. The windshield wiping device comprises a wiper blade with an elongated upper part, which is at least partly bendable, an elongated lower part, which is at least partly bendable, several connection elements for connecting the upper part and the lower part, wherein the connection elements are spaced apart from each other along a lengthwise dimension of the wiper blade, and wherein the connection elements are designed to enable a movement of the upper part and the lower part relative to each other with a movement component along a lengthwise dimension of the wiper blade. A cross section of the wiper blade perpendicular to its lengthwise dimension is essentially trapezoidal.

Preferred optional embodiments and special aspects of the invention emerge from the dependent claims, the drawings, and the present description.

According to the embodiments described here, windshield wiping devices and especially a fin ray windshield wiping device are provided for vehicle windshields, which prevent streaking and/or fogging during fast driving and have an improved ability to remove snow from the windshield. The trapezoidal cross section or the trapezoidal shape of the cross section of the wiper blade presents a reduced wind attack surface, so that a lifting of the wiper blade due to the wind can be reduced or even prevented, thereby preventing streaking and/or fogging when driving fast. Moreover, the shape offers the advantage that at least one edge is provided with an acute angle in the wiping direction, which acts as a knife and thus effectively removes the snow from the windshield.

According to embodiments of the disclosure, the connection elements are spaced apart from each other along the lengthwise dimension of the wiper blade. In this way, cavities or windows can be provided between neighboring connection elements. The snow can be effectively transported away through these cavities or windows, which reduces or prevents the formation of a buildup of snow or a snow wedge during the wiping process.

According to typical embodiments, the trapezium shape or the trapezium has two parallel sides, which are called the base sides, and two sides joining them, which are called the legs.

According to some embodiments, the elongated upper part and the elongated lower part each form a base side of the trapezium shape or the trapezoidal shape. In typical embodiments, one base side is longer than the other. The longer of the two base sides can be called the base of the trapezium. For example, the elongated lower part forms the base of the trapezium shape or the trapezoidal shape. According to embodiments, the connection elements of the windshield wiping device can form the legs of the trapezium shape or the trapezoidal shape. Such a trapezium shape or trapezoidal shape presents in particular a reduced wind attack surface or wind lift surface and at least one edge with an acute angle, which can function as the knife described above. In particular, the edge can be formed by the elongated lower part and one of the legs.

According to embodiments described here, the elongated upper part has at least one projection along the lengthwise dimension of the wiper blade. In certain embodiments, the elongated lower part has at least one projection along the lengthwise dimension of the wiper blade. The projection can function as a knife, which can effectively remove snow from the windshield, and in particular peel or scrape it away.

In sample embodiments, the at least one projection extends beyond the trapezium, and especially beyond one leg of the trapezium. For example, the windshield wiping device can comprise two projections, one projection being provided each time in the two wiping directions. Thus, for example, the elongated lower part can extend beyond both legs of the trapezium shape, so that an edge, especially a knife edge, is formed in each wiping direction. This enables a removal of snow in both wiping directions, which further enhances the efficiency of the windshield wiping device.

According to other typical embodiments, the at least one projection can be integrated with the elongated lower part, and in particular the at least one projection and the elongated lower part can consist of the same material. According to embodiments, the at least one projection can be integrated with the elongated upper part, and in particular the at least one projection and the elongated upper part can consist of the same material. This enables a simple and economical manufacture of the windshield wiping device.

For example, the knife edge can have a bevel. The bevel can be a slanting surface which is present on the knife edge. This makes possible a further improvement in the efficiency of removal of snow from the windshield.

According to embodiments of the disclosure which can be combined with other embodiments described herein, the at least one projection or the at least one knife edge can consist of a material from the group: TPE (thermoplastic elastomer), especially TPE-S, TPE-O, TPE-U, TPE-A, TPE-V, TPE-E; ethylene propylene diene rubber (EPDM); polychloroprene and natural rubber. The choice of the material of the projection and/or the knife edge allows one to adjust the physical properties of the projection and/or the knife edge.

According to typical embodiments, at least one wiper lip is arranged on the elongated lower part. For example, the wiper lip is provided for a contact with the windshield. For example, the wiper lip is fashioned as a single part with the elongated lower part, in particular it can consist of the same material. According to some other typical embodiments, the wiper lip can be mounted on the elongated lower part, wherein the wiper lip and the elongated lower part can comprise different materials. The wiper lip can be fastened removably on the elongated lower part, so that the wiper lip can be replaced, for example, when worn down or damaged. This enables a cost reduction, since when the wiper lip is worn down it is not necessary to replace the entire windshield wiping device, but only the wiper lip. The separation of wiper lip and lower part of the windshield wiping device can also achieve inter alia a better choice of materials for the individual elements for many applications.

According to other typical embodiments, the wiping lip can be an essentially L-shaped structure, an essentially C-shaped structure, a structure forming a closed cavity, or a U-shaped structure. Furthermore, the structure can also be multilayered, wherein several layers form the wiping lip. Thanks to the multilayered design, a layer can be removed or peeled off when the wiper lip or wiping edge becomes worn down, which increases the lifetime of the windshield wiping device.

According to embodiments of the disclosure which can be combined with other embodiments described herein, the at least one wiper lip is made of a material from the group: TPE (thermoplastic elastomer), especially TPE-S, TPE-O, TPE-U, TPE-A, TPE-V, TPE-E; ethylene propylene diene rubber (EPDM); polychloroprene and natural rubber. The choice of the material of the wiping edge allows one to adjust the physical properties of the wiping edge.

BRIEF DESCRIPTION OF THE DRAWINGS

Sample embodiments of the invention are presented in the figures and are described more closely below. There are shown:

FIG. 1A, a schematic representation of a windshield wiping device according to the prior art, FIG. 1B, a schematic representation of a cross section of the wiper blade of the windshield wiping device per FIG. 1A, FIG. 2A, a schematic representation of a windshield wiping device according to embodiments of the disclosure, FIG. 2B, a schematic representation of a cross section of the wiper blade of the windshield wiping device per FIG. 2A, FIG. 3, a visual field comparison between the windshield wiping device according to the prior art and the windshield wiping device according to embodiments of the disclosure, FIGS. 4A, 4B and 4C, schematic representations of a windshield wiping device according to embodiments of the disclosure for removal of snow from a windshield, FIG. 5, a schematic representation of a windshield wiping device according to embodiments of the disclosure, FIG. 6A, a schematic representation of a wiper blade of a windshield wiping device according to embodiments of the disclosure in a bottom position, FIG. 6B, a schematic representation of the wiper blade of a windshield wiping device according to embodiments of the disclosure per FIG. 6A in a position laid against a window, FIG. 7A, a schematic representation of another sample embodiment of a windshield wiping device according to the invention in the form of a wiper arm with integrated wiper blade in a bottom position, FIG. 7B, a schematic representation of the wiper arm with integrated wiper blade per FIG. 7A in a position laid against a window, and FIG. 8, a schematic perspective representation of a wiper arm of a windshield wiping device according to embodiments of the disclosure.

DETAILED DESCRIPTION

Figure 3:
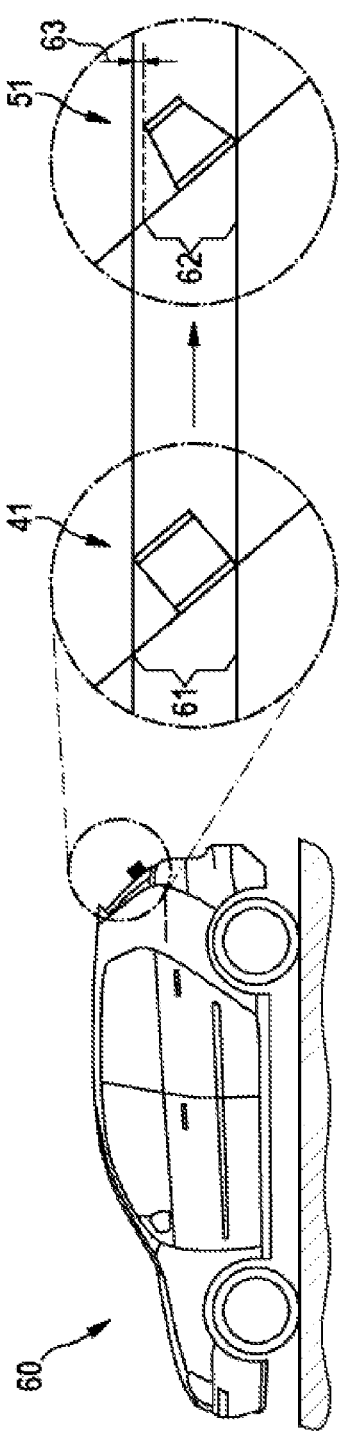

In the following, unless otherwise noted, the same reference symbols shall be used for identical and similarly functioning elements.

FIG. 1A shows a schematic representation of a windshield wiping device 40 according to the prior art, and FIG. 1B shows a schematic representation of a cross section of the wiper blade of the windshield wiping device of FIG. 1A.

The traditional windshield wiping device 40 comprises a wiper blade 41 with a lengthwise dimension 8 and with an upper part 42 and a lower part 43, which are joined by several connection elements 18. The cross section of the wiper blade 41 of the traditional windshield wiping device 40 has an essentially rectangular or square cross section. The cross section shown in FIG. 1B runs along the line designated by reference number 44 in FIG. 1A.

The traditional windshield wiping device 40 can have a fastening part 45 at the wiper blade side, which is designed to be connected for example to a fastening element on the motor vehicle. Thus, the windshield wiping device can be attached to the vehicle, especially in removable manner.

The rectangular or square cross section of the traditional windshield wiping device 40 presents an increased wind attack surface, so that it may happen when driving fast that the wiper blade loses contact with the window. This may result in streaking and/or fogging. The rectangular or square cross section also means, for example when there is snow on the windshield, that a snow wedge builds up on the wiper blade, resulting in steadily increasing forces acting on the wiper or needing to be exerted by it. The field of vision can also be reduced, since the snow cannot be removed adequately from the windshield, for example.

These drawbacks can be avoided by the windshield wiping device according to the embodiments of the disclosure.

According to the disclosures described here, windshield wiping devices and especially a fin ray windshield wiping device are provided for vehicle windshields with trapezoidal cross section. The windshield wiping devices can thus prevent streaking and/or fogging during fast driving and furthermore have an improved ability to remove snow from the windshield. In particular, the trapezoidal cross section of the wiper blade presents a reduced wind lift surface, so that a lifting of the wiper blade due to the wind can be reduced or even prevented, thereby preventing streaking and/or fogging when driving fast. Moreover, the trapezium shape offers the advantage that at least one edge is provided with an acute angle in the wiping direction, which acts as a knife and thus effectively removes the snow from the windshield, and in particular peels or scrapes it off.

FIG. 2A shows a schematic representation of a windshield wiping device 50 according to embodiments of the disclosure, and FIG. 2B shows a schematic representation of a cross section of the wiper blade 51 of the windshield wiping device 50 per FIG. 2A along line 54.

The configuration of the windshield wiping device for the embodiments described here can be realized with the windshield wiping devices described as examples in FIGS. 6A, 6B, 7A, 7B and 8, especially a fin ray windshield wiping device.

The wiper blade 51 of the windshield wiping device 50 comprises an elongated upper part 52 and an elongated lower part 53, which are joined by a plurality of connection elements 18. The lower part 52 during operation of the windshield wiping device 50 is turned toward a window, such as a window of a motor vehicle. The wiper blade 51, as shown in FIG. 2B, has an essentially trapezoidal cross section perpendicular to the lengthwise dimension of the wiper blade 51. In this way, the formation of streaks and/or fog when driving fast can be prevented and there is an improved ability to remove snow from the windshield. The windshield wiping device 50, and particularly the wiper blade 51, also has a more slender appearance compared to the traditional windshield wiping device of FIG. 1A (for the same normal projected surface). This reduces the visibility of the wiper, which results in reduced viewing obstruction, for example to the rear, if the windshield wiping device is mounted at the rear.

According to embodiments described here, which can be combined with other embodiments, the upper part 52 has, in a cross section of the wiper blade perpendicular to its lengthwise dimension, a first dimension (its width) in a plane parallel to a wiping plane and the lower part 53 has a second dimension (its width) in a plane parallel to the wiping plane, wherein the first dimension of the upper part is smaller than the second dimension of the lower part. Thanks to the smaller width of the upper part, a trapezoidal cross section or trapezium-like cross section is provided, which shall be called essentially trapezoidal in the context of the present disclosure.

According to embodiments of the disclosure, the connection elements 18 are spaced apart along the lengthwise dimension 8 of the wiper blade 51. In this way, cavities or windows can be provided between neighboring connection elements 18. The snow can be effectively transported away through these cavities or windows, which reduces or prevents the formation of a buildup of snow or a snow wedge during the wiping process.

According to typical embodiments, which can be combined with other embodiments, the trapezium shape or the trapezium has two parallel sides, which can be called the base sides, and two sides joining them, which can be called the legs.

According to some embodiments, the elongated upper part 52 and the elongated lower part 53 each form a base side of the trapezium shape. In typical embodiments, one base side is longer than the other. The longer of the two base sides can be called the base of the trapezium. For example, as is shown in FIGS. 2A and 2B, the elongated lower part 53 forms the base of the trapezium shape. According to embodiments, the connection elements 18 of the windshield wiping device can form the legs of the trapezium shape. Such a trapezium shape presents in particular a reduced wind lift surface and at least one edge 56 with an acute angle, which can function as a knife. In particular, the at least one edge 56 can be formed by the elongated lower part 53 and one of the legs.

The windshield wiping device 50 according to embodiments can have a fastening part 55 at the wiper blade side, which is designed to be connected for example to a fastening element on the motor vehicle. Thus, the windshield wiping device 50 can be attached to the vehicle, especially in removable manner.

FIG. 3 shows a visual field comparison between the windshield wiping device according to the prior art and the windshield wiping device according to embodiments of the disclosure.

In the example shown in FIG. 3, the windshield wiping device is mounted at the rear of a vehicle 60. The first enlarged cutout (left) shows the wiper blade 41 of the windshield wiping device from the prior art with the rectangular or square cross section. As shown in FIG. 3, the traditional wiper blade 41 blocks the field of vision through the rear window in its extent or with a first height 61. In contrast, as shown in the second enlarged cutout (right) in FIG. 3, the trapezoidal wiper blade 51 according to embodiments of the disclosure covers the field of vision through the rear window in its extent or with a second height 62, which is smaller by an amount 63 than the first height 61.

Thus, the windshield wiping device according to the embodiments of the disclosure, and especially the wiper blade, has a more slender appearance (for the same normal projected surface) as compared to the traditional windshield wiping device. This reduces the visibility of the wiper, which results in a reduced viewing obstruction, for example to the rear, when the windshield wiping device is mounted at the rear.

Although FIG. 3 shows an example of a rear window wiper, the embodiments of the disclosure are not confined to this. In particular, the embodiments of the disclosure can also be implemented for front windshield wipers. Moreover, the windshield wiping device 51 shown in FIG. 3 can also be realized as one of the embodiments shown in FIGS. 4A-C and 5.

Figure 4A:
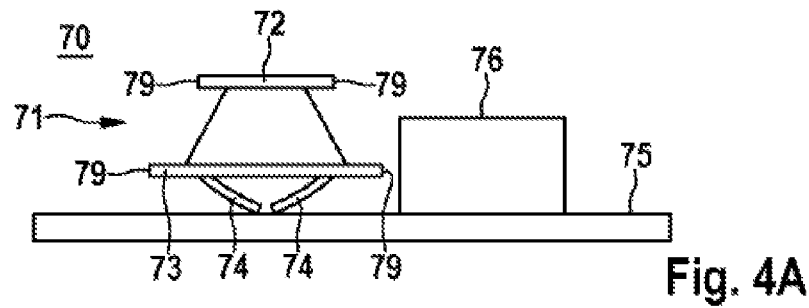
Figure 4B:
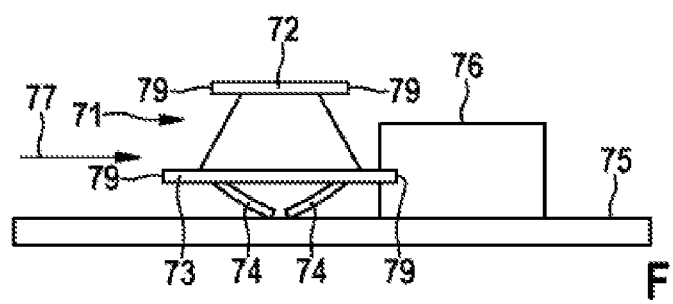
Figure 4C:
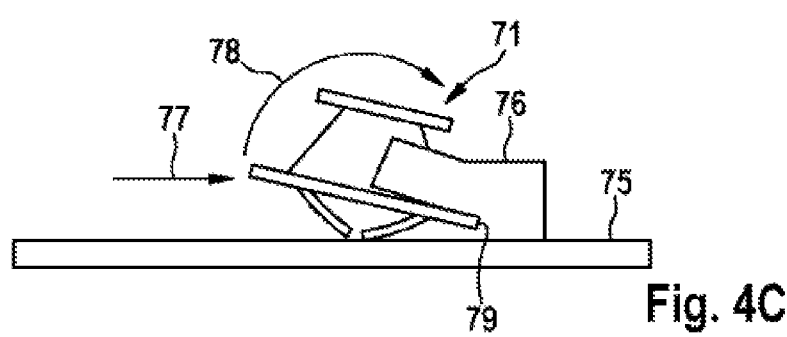

FIGS. 4A, 4B and 4C show schematic representations of a windshield wiping device 70 according to embodiments of the disclosure and the removal of snow from a windshield 75 making use thereof.

The wiper blade 71 of the windshield wiping device 70 comprises an elongated upper part 72 and an elongated lower part 73, which are joined by a plurality of connection elements. The lower part 72 during operation of the windshield wiping device 70 is turned toward the window 75, such as a window of a motor vehicle. The wiper blade 71 has an essentially trapezoidal cross section perpendicular to the lengthwise dimension of the wiper blade 71.

According to embodiments described here, which can be combined with other embodiments, the wiper blade 71 has at least one projection 79. In particular, the elongated upper part 72 and/or the elongated lower part 73 can have the at least one projection 79 along the lengthwise dimension of the wiper blade 71. For example, only the elongated upper part 72 or only the elongated lower part 73 can have a projection 79, or both the elongated upper part 72 and the elongated lower part 73 can each have at least one, and especially two projections 79. In the example shown in FIG. 4A-C, the windshield wiping device 70 has four projections, two each on the elongated lower part 72 and on the elongated upper part 73. The projection 79 can function as a knife, which can effectively remove snow from the windshield, and in particular peel or scrape it away.

In sample embodiments, the at least one projection 79 extends beyond the trapezium, and especially beyond one leg of the trapezium, as is shown in FIG. 4A-C. For example, the windshield wiping device 70, and especially the elongated lower part 73, can comprise two projections 79, one projection 79 being provided each time in the two wiping directions. Thus, for example, the elongated lower part 73 can extend beyond both legs of the trapezium shape, so that an edge, especially a knife edge, is formed in each wiping direction. This enables a removal of snow in both wiping directions, which further enhances the efficiency of the windshield wiping device.

According to some embodiments, the knife edge can have a bevel. The bevel can be a slanting surface which is present on the knife edge. This makes possible a further improvement in the efficiency of removal of snow from the windshield.

According to other typical embodiments, the at least one projection 79 can be integrated with the elongated lower part 73, and in particular the at least one projection 79 and the elongated lower part 73 can consist of the same material. According to embodiments, the at least one projection 79 can be integrated with the elongated upper part 72, and in particular the at least one projection and the elongated upper part 72 can consist of the same material. This enables a simple and economical manufacture of the windshield wiping device.

According to embodiments of the disclosure which can be combined with other embodiments described herein, the at least one projection 79 or the at least one knife edge is made of a material from the group consisting of: TPE (thermoplastic elastomer), especially TPE-S, TPE-O, TPE-U, TPE-A, TPE-V, TPE-E; ethylene propylene diene rubber (EPDM); polychloroprene and natural rubber. The choice of the material allows one to adjust the physical properties of the at least one projection 79 or the at least one knife edge.

According to typical embodiments which can be combined with other embodiments described herein, at least one wiper lip 74 is arranged on the elongated lower part 73. For example, the wiper lip 74 is provided for a contact with the windshield 75. For example, the wiper lip 74 is fashioned as a single piece with the elongated lower part 73, in particular it can consist of the same material. According to some other typical embodiments, the wiper lip 74 can be mounted on the elongated lower part 73. In such a case, the wiper lip 74 and the elongated lower part 73 can comprise different materials. The wiper lip 74 can be fastened removably on the elongated lower part 73, so that the wiper lip 74 can be replaced, for example, when worn down or damaged. This enables a cost reduction, since when the wiper lip 74 is worn down it is not necessary to replace the entire windshield wiping device, but only the worn-down or damaged wiper lip 74. The separation of wiper lip 74 and elongated lower part 73 of the windshield wiping device 70 can also achieve inter alia a better choice of materials for the individual elements for many applications.

According to other typical embodiments, the wiper lip 74 can be an essentially L-shaped structure, an essentially C-shaped structure, a structure forming a closed cavity, or a U-shaped structure. Furthermore, the structure can also be multilayered, wherein several layers form the wiper lip 74. Thanks to the multilayered design, a layer can be removed or peeled off when the wiper lip 74 becomes worn down, which increases the lifetime of the windshield wiping device.

In the example of FIG. 4A-C, a C-shaped structure is shown. For example, the at least one C-shaped wiper lip 74 can be arranged with its opening toward the middle of the wiper blade 71, and in particular toward the middle of the elongated lower part 73. In particular, two C-shaped wiper lips 74 can be present on the elongated lower part 73, which can be arranged as mirror images, for example. In such a case, the openings of the C-shape can be arranged opposite each other, as also shown in the example of FIG. 4A-C.

According to other embodiments which can be combined with other embodiments described herein, a variable stiffness, i.e., spatially variable stiffness of the wiper lip 74 can be provided along the length of the windshield wiping device 70, i.e., along the lengthwise dimension of the windshield wiping device 70. In this way, any possibly existing bearing force fluctuations along the lengthwise dimension of the windshield wiping device 70 can be adapted through the adapted stiffness of the wiper lip 74.

According to embodiments of the disclosure which can be combined with other embodiments described herein, the at least one wiper lip 74 is made of a material from the group consisting of: TPE (thermoplastic elastomer), especially TPE-S, TPE-O, TPE-U, TPE-A, TPE-V, TPE-E; ethylene propylene diene rubber (EPDM); polychloroprene and natural rubber. The choice of the material of the wiper lip 74 allows one to adjust the physical properties of the wiper lip 74.

In what follows, the mode of functioning of the windshield wiping device is explained with the help of FIG. 4A-C.

Referring to FIG. 4A, snow 76 is present on the windshield 75 of the vehicle. The windshield wiping device 70 has the projection or knife edge 79. Although the windshield wiping device 70 in FIG. 4A-C is shown with the projections 79 and the wiper lips 74, the present disclosure is not limited to this. In particular, the windshield wiping device can also be configured as that in FIGS. 2A and 2B and provide the same or similar functionalities as are described below.

Referring to FIG. 4B, the windshield wiping device 70 and especially the wiper blade 71 moves in a wiping direction 77. The edge or the projection 79 of the wiper blade 71 cuts into the snow 76, and thereby removes the snow in effective manner from the window 75. As shown in FIG. 4C, a torsional movement 78 of at least one part of the bendable wiper blade 71 can occur especially thanks to an elasticity of the at least one wiper lip 74. This torsional movement 78 results in an altered angle or angle of incidence of the edge/projection 79 relative to the window 75, which results in a further increase in the efficiency of the process of removal of snow 76 from the window 75.

With traditional wipers, a snow wedge builds up constantly, which can result in constantly increasing forces and a reduced field of vision. The windshield wiping device according to the present disclosure can scrape or peel the snow off from the window in slices like a potato peeler by means of the elongated lower part (bending beam), which functions as a knife. The snow can be transported away through the cavities (windows) which are present in the wiper blade, especially thanks to the spaced apart connection elements. Thanks to the trapezium shape, the bottom side of the wiper makes contact first with the snow, which results in a torsion, such as a clockwise torsion, and thus produces a particular angle of incidence, which is especially well suited to peeling and scraping. Alternatively, the knife edge can be provided with a bevel to improve the cutting action. The edge can be made of a rubberlike material, in order to minimize the danger of injury.

Figure 5:
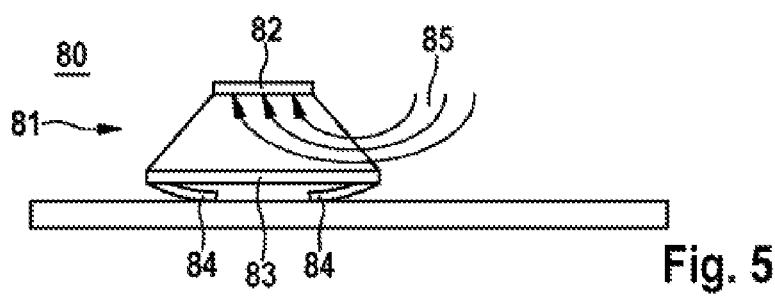

FIG. 5 shows a schematic representation of a windshield wiping device 80 according to embodiments of the disclosure. The windshield wiping device 80 can also be designed as a windshield wiping device shown in FIGS. 2A and 2B or 4A-C.

The windshield wiping device 80 of FIG. 5 has a wiper blade 81 with an elongated upper part 82, an elongated lower part 83, and wiper lips 84. As is shown in FIG. 5, a wind attack surface or wing lift surface for driving wind 85 can be formed essentially by a surface of the elongated upper part 82. One reason for this can be the spaced apart connection elements, between which cavities or windows can be present, and through which air can flow. The trapezoidal cross section of the wiper blade of the windshield wiping device 80 provides a reduced or minimal surface of the elongated upper part 82, which results in a reduced wind lift surface. In this way, a wind-related lifting of the wiper blade can be reduced or even avoided, so that streaking and/or fogging during fast driving is prevented.

In the following, sample embodiments of windshield wiping systems are described, for which the windshield wiping device described herein can be used.

Figure 6A:
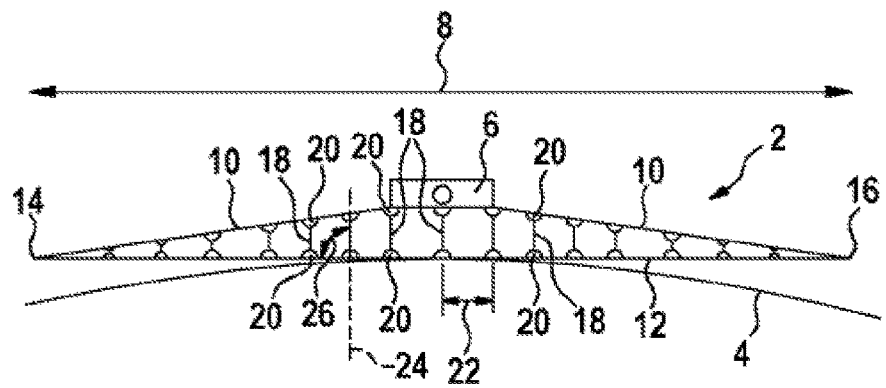
Figure 6B:
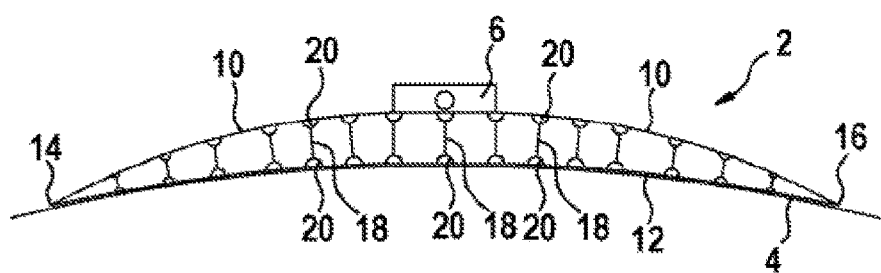

FIGS. 6A and 6B show schematic representations of a wiper blade 2 in a bottom position (FIG. 6A) and in a position (FIG. 6B) placed against a window according to embodiments of the windshield wiping device of the disclosure. The wiper blade 2 serves to wipe a window 4 of a vehicle, which is for example a motor vehicle, especially an auto. Usually the wiper blade 2 is placed on a window wiping arm, which is driven by means of a motor for the wiping. For this, the wiper blade 2 has a support 6, at which it can be fastened on the window wiping arm. The wiper blade 2 in FIG. 6A is in a bottom position, in which it is at least partly lifted from the window 4. The windshield wiping device, and especially the wiper blade 2, can be configured according to the embodiments of the disclosure, as are described above with reference to FIGS. 2 to 5.

The wiper blade 2 has the lengthwise dimension 8 and the elongated upper part 10 and the likewise elongated lower part 12. The lengthwise dimension of the upper part 10 and the lower part 12 basically correspond to the lengthwise dimension 8 of the wiper blade 2. The wiper blade 2 here has a trapezoidal cross section perpendicular to the lengthwise dimension 8 according to the embodiments of the disclosure.

Both the upper part 10 and the lower part 12 are bendable beams or can be designed as bendable beams, each of them being a single piece as an example shown in FIGS. 6A and 6B. This enables an especially stable design. It is likewise possible to have only one part in each case of the upper part 10 and/or lower part 12 being bendable. Moreover, it is alternatively possible for the upper part 10 to consist of two pieces, wherein then one end of the two pieces of the two-piece upper part 10 is fastened to the support 6.

According to many embodiments which can be combined with the other embodiments described here, a material is used for the upper part 10 and/or the lower part 12 which has a modulus of elasticity lying in a range between 0.005 kN/mm$^2$ and 0.5 kN/mm$^2$, especially 0.01 kN/mm$^2$ and 0.1 kN/mm$^2$. This enables a suitable bendability of the upper part 10 and the lower part 12. Together with a suitably designed cross sectional area of the upper part 10 and the lower part 12, one thus gets an optimal bendability. The upper part 10 and the lower part 12 are disposed so that they lie opposite each other. Both ends of the upper part 10 are firmly connected at outer connection positions 14 and 16 to one end apiece of the lower part 12. Otherwise, the upper part 10 and the lower part 12 are spaced apart.

The upper part 10 and the lower part 12 are joined together by connection elements 18. In particular, in the bottom position of the wiper blade 2, these extend roughly transverse to the lengthwise dimension 8 of the wiper blade 2. The connection elements 18 are attached by rotary joints 20 at mutually facing inner lengthwise sides of the upper part 10 and the lower part 12. The rotary joints 20 here are hinges. In particular, the rotary joints 20 can be designed as film hinges. This is especially advantageous when upper part 10, lower part 12 and/or connection elements 18 are made from a plastic material or coated with a suitable plastic material.

According to typical embodiments described here, which can be combined with other embodiments described here, a rotary joint is chosen from the following group consisting of: a hinge, a film hinge, a narrowing of the material to produce less stiffness along a torsion axis, a joint with an axis of rotation, a means of connecting the upper part to the connection element or connecting the lower part to the connection element allowing a sliding of the lower part in relation to the upper part along the lengthwise dimension, etc.

Embodiments in which the joint is provided by a film hinge thus provide a very simple means of providing the joints for a fin ray wiper. The wiper blade 2 can be a single piece, in particular, tooled. According to typical embodiments, the film hinges have good stretchability. This can be provided, for example, by a material chosen from the group of PP, PE, POM and PA. Alternatively, the film hinges can be made from one or more materials of a group consisting of: TPE (thermoplastic elastomer), such as TPE-S, TPE-O, TPE-U, TPE-A TPE-V and TPE-E.

The connection elements 18 are spaced apart from each other along the lengthwise dimension of the wiper blade 2. The distances between every two neighboring connection elements 18 are equal. But they can also be chosen to be different. The distances are advantageously less than 50 mm, especially less than 30 mm. In this way, an especially high flexibility of the windshield wiping device can be assured, especially of its lower part, and good adaptation to the curvature and changes in curvature of the window being wiped. FIG. 6A shows a distance 22 as representative of the distances between every two connection elements 18. The connection elements 18, especially in the bottom position of the wiper blade 2, are attached to the lower part 12 such that their lengthwise axes subtend angles 26 with the lower part 12 which are between 65° and 115°, especially between 75° and 105°. Especially advantageously, the angles lie between 80° and 100°. This advantageously assures an especially good transmission of a force acting on the lower part to the upper part. Moreover, an especially stable windshield wiping device can be achieved in this way. The same holds for the attachments of the connection elements 18 to the upper part 10.

The same holds in the present sample embodiment for the attachments of the connection elements 18 to the upper part 10.

FIG. 6A shows one lengthwise axis 24 as an example of the lengthwise axes of the connection elements 18 and one angle 26 as an example for the angles between the connection elements 18 and the lower part 12. The distances between the upper part 10 and the lower part 12 are primarily determined by the lengths of the connection elements 18. The lengths of the connection elements 18 increase, starting from the two outer connection positions 14, 16 to approximately those positions at which the support 6 arranged on the upper part 10 begins. In this way, upper part 10 and lower part 12 in lateral view looking at the wiper blade 2 per FIG. 6A form a double wedge, the vertices of the two wedges pointing in opposite directions. The connection elements 18 are of buckle-proof design. The wiper blade 2 here has a trapezoidal cross section perpendicular to the lengthwise dimension 8 according to the embodiments of the disclosure.

FIG. 6B shows a schematic representation of the wiper blade 2 of FIG. 6A in a position placed against the window 4. Since the window 4 has a curvature, contact pressure forces act on the lower part 12 when the wiper blade 2 is placed against the window 4. Since the upper part 10 and the lower part 12 are bendable beams and the connection elements 12 are mounted rotatably on the upper part 10 and lower part 12, the upper part 10 and lower part 12 can slide relative to each other. Thanks to the pressure forces acting on the lower part 12 from below, the wiper blade 2 bends in the direction from which the pressure forces are arriving, and adapts itself precisely to the curvature of the window 4.

Thanks to the design of the embodiments described here, when a force acts on the lower part (through the window 4) there is a bending of the lower part in the direction from which the force is acting. This is dictated by the connection of the upper part 10 and the lower part at a connection position 14 and/or 16, the shape, and rotary joints at the connection between the connection elements and the upper and lower part.

In the representation of FIG. 6B, a slight spacing is present between the wiper blade 2 and the window 4, which serves here only to illustrate the window 4 and the wiper blade 2 and is for the most part not present in reality when the wiper blade 2 bears against the window 4. Furthermore, a wiper lip is typically present at the bottom side of the lower part 12, facing away from the upper part 10, according to the embodiments described here, which is placed on the window 4 for the wiping process. For reasons of clarity, the wiper lip is not shown in FIGS. 6A and 6B.

A windshield wiping device according to the embodiments described here uses the tail fin effect of certain fish, which when pressure comes from the side do not give way in the direction of the pressure, but instead arch themselves in the opposite direction, i.e., the direction from which the pressure is arriving. This principle is also known as the fin jet or "fin ray" principle. Thus, a windshield wiping device according to the embodiments described herein has the advantage of a better adaptation to a window of a motor vehicle. With a traditional windshield wiping device, its upper part is usually rigid, i.e., not bendable in design.

FIGS. 6A and 6B show a wiper blade 2 with lengthwise dimension 8, which extends essentially between the connection positions 14 and 16. Such an arrangement is often used for front windshield wipers. Alternatively, however, a windshield wiping device can also have only one connection position, which by analogy with FIGS. 6A and 6B corresponds to a cutting of the windshield wiping device in half, and wherein a rotary axis is provided at one position of the support 6 as an example. Such an arrangement is often used for rear window wipers. This is shown, as an example, in FIGS. 7A and 7B. Optional configurations and details which are described in the individual embodiments can generally be used for both variants of arrangement of a windshield wiping device.

Figure 7A:
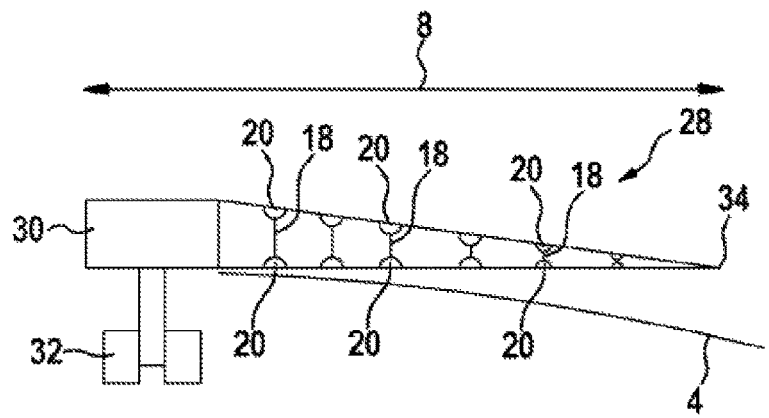

FIG. 7A shows a schematic representation of another sample embodiment of the windshield wiping device according to the invention in the bottom position. The windshield wiping device here is a wiper arm with an integrated wiper blade 2, which is arranged on a fastening part 30. The fastening part 30 is connected to a wiper motor 32, which drives the fastening part 30 to wipe the window 4. The wiper blade 2 is wedge shaped, one end of the upper part 10 being firmly connected at an outer connection position 34 to one end of the lower part 12. The respective other end of the upper part 10 and the lower part 12 are attached to the fastening part 30. Regarding the basic design and especially the attachments of the connection elements 18, the windshield wiping device of FIG. 7A corresponds basically to that of FIG. 6A. The wiper blade 2 here has a trapezoidal cross section perpendicular to the lengthwise dimension 8, according to the embodiments of the disclosure.

Figure 7B:
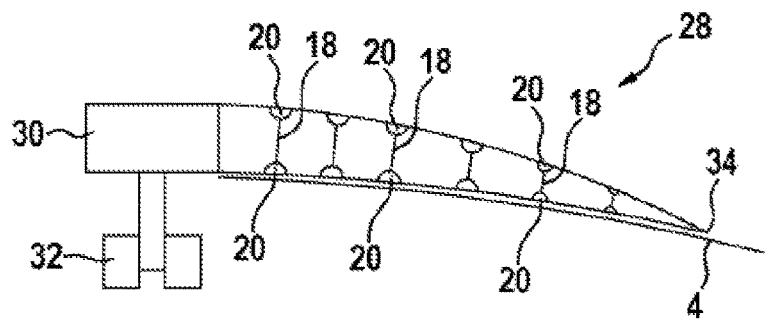

FIG. 7B shows a schematic representation of the wiper blade 2 with integrated wiper arm 30 per FIG. 7A in a position laid against the window 4. Here as well, pressure forces act from below from the direction of the window 4 on the lower part 12 of the wiper blade 2, so that the lower part 12 and the upper part 10 bend in the direction of the window 4.

In both FIG. 6A and FIG. 7A the wiper blade is shown in its position not placed against the window, so that the lower part 12 is essentially straight. According to yet other embodiments, which can be combined with other embodiments, the lower part in the unloaded state is convex in configuration, i.e., with a vaulting which projects away from the upper part in a middle region. The windshield wiping device according to the embodiments described here can typically take on the corresponding concave shape of the lower part, adapting to the window, upon making contact with a window and starting from the convex shape of the lower part.

Figure 8:
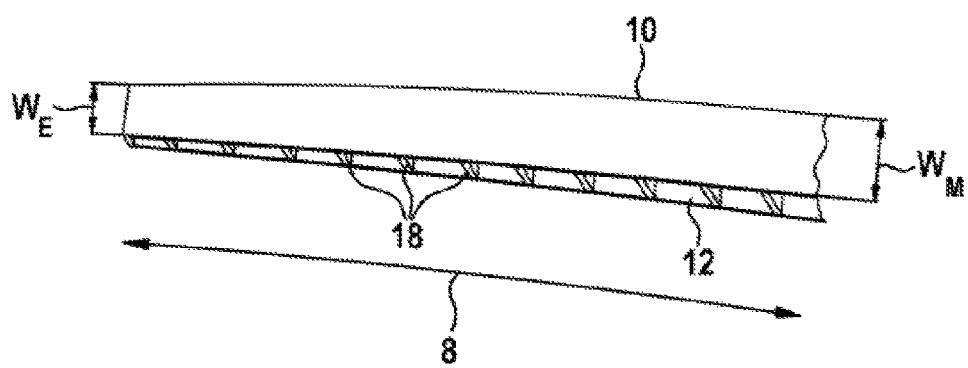

FIG. 8 is a schematic perspective representation of a wiper blade 2 of a windshield wiping device according to embodiments of the disclosure. As shown in FIG. 8, the wiper blade 2 has an outer width $W_E$ at the outer connection positions where the ends of the elongated upper part 10 and the lower part 12 are joined to each other. According to typical embodiments, the outer width $W_E$ is at least 15 mm, especially at least 20 mm, in particular at least 25 mm.

According to embodiments of the disclosure, which can be combined with other embodiments, the width of the wiper blade 2 increases from the outer connection positions in the direction of the fastening part 30 or the support 6 on which the wiper blade can be attached to the window wiping arm. In FIG. 8, for example, an inner width is designated as $W_M$. According to typical embodiments, the inner width $W_M$ is at least 20 mm, especially at least 25 mm, especially at least 30 mm.

What is claimed is:

1. A windshield wiping device (50, 70) for a vehicle, comprising a wiper blade (51, 71) with
    an elongated upper part (52, 72), which is at least partly bendable,
    an elongated lower part (53, 73), which is at least partly bendable, the upper part and the lower part defining an interior space therebetween, and
    a plurality of connection elements (18) disposed in the interior space and connecting the upper part (52, 72)

and the lower part (53, 73), wherein the connection elements (18) are spaced apart from each other along a lengthwise dimension (8) of the wiper blade (51, 71), and wherein the connection elements (18) are configured to enable a movement of the upper part (52, 72) and the lower part (53, 73) relative to each other with a movement component along the lengthwise dimension (8) of the wiper blade (51, 71), wherein in a cross section of the wiper blade perpendicular to the lengthwise dimension (8) the upper part has a first dimension in a first plane parallel to a wiping plane and the lower part has a second dimension in a second plane parallel to the wiping plane, wherein the first dimension of the upper part is smaller than the second dimension of the lower part.

2. The windshield wiping device (50, 70) as claimed in claim 1, wherein the cross section has a trapezium or trapezoidal shape.

3. The windshield wiping device (50, 70) as claimed in claim 2, wherein the elongated upper part (52, 72) and the elongated lower part (53, 73) each form a base side of the trapezium or trapezoidal shape.

4. The windshield wiping device (50, 70) as claimed in claim 2, wherein the elongated lower part (53, 73) forms a base of the trapezium or trapezoidal shape.

5. The windshield wiping device (50, 70) as claimed in claim 2, wherein the connection elements (18) form legs of the trapezium or trapezoidal shape.

6. The windshield wiping device (70) as claimed in claim 2, wherein the elongated upper part (52, 72) and the elongated lower part (53, 73) each form a base side of a trapezoidal shape.

7. The windshield wiping device (70) as claimed in claim 2, wherein the elongated upper part (52, 72) and the elongated lower part (53, 73) each form a base side of a trapezium shape.

8. The windshield wiping device (70) as claimed in claim 1, wherein at least one of the elongated upper part (72) and the elongated lower part (73) has at least one projection (79) along the lengthwise dimension (8) of the wiper blade (71).

9. The windshield wiping device (70) as claimed in claim 8 wherein the connection elements (18) form legs of a trapezium shape, and wherein the at least one projection (79) extends beyond the trapezium shape.

10. The windshield wiping device (70) as claimed in claim 8, wherein the at least one projection (79) is a knife edge.

11. The windshield wiping device (70) as claimed in claim 10, wherein the knife edge has a bevel.

12. The windshield wiping device (70) as claimed in claim 8, wherein the projection (79) comprises a material from the group: TPE (thermoplastic elastomer); ethylene propylene diene rubber (EPDM); polychloroprene; and natural rubber.

13. The windshield wiping device (70) as claimed in claim 8 wherein the connection elements (18) form legs of a trapezium shape, and wherein the at least one projection (79) extends beyond the legs of the trapezium shape.

14. The windshield wiping device (70) as claimed in claim 13, wherein the at least one projection (79) is a knife edge.

15. The windshield wiping device (70) as claimed in claim 14, wherein the knife edge has a bevel.

16. The windshield wiping device (70) as claimed in claim 8, wherein the projection (79) comprises a material from the group: TPE (thermoplastic elastomer), including TPE-S, TPE-O, TPE-U, TPE-A, TPE-V, TPE-E; ethylene propylene diene rubber (EPDM); polychloroprene; and natural rubber.

17. The windshield wiping device (70) as claimed in claim 1, wherein at least one wiper lip (74) is arranged on the elongated lower part (73).

18. The windshield wiping device (70) as claimed in claim 17, wherein the wiper lip (74) is an L shaped structure, a C-shaped structure, a structure forming a closed cavity, or a U-shaped structure.

19. The windshield wiping device (70) as claimed in claim 17, wherein the wiper lip (74) comprises a material from the group: TPE (thermoplastic elastomer); ethylene propylene diene rubber (EPDM); polychloroprene; and natural rubber.

20. The windshield wiping device (70) as claimed in claim 17, wherein the wiper lip (74) comprises a material from the group: TPE (thermoplastic elastomer), including TPE-S, TPE-O, TPE-U, TPE-A, TPE-V, TPE-E; ethylene propylene diene rubber (EPDM); polychloroprene; and natural rubber.

21. The windshield wiping device (70) as claimed in claim 1, wherein each of the connection elements is a single, elongate member, arranged parallel to each of the other connecting elements in an unloaded state.

* * * * *